(12) United States Patent
Lovell et al.

(10) Patent No.: US 7,495,446 B2
(45) Date of Patent: Feb. 24, 2009

(54) FORMATION EVALUATION SYSTEM AND METHOD

(75) Inventors: John R. Lovell, Houston, TX (US); Christopher C. Bogath, Gloucestershire (GB); Steven J. Pringnitz, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 352 days.

(21) Appl. No.: 11/209,369

(22) Filed: Aug. 23, 2005

(65) Prior Publication Data

US 2007/0052551 A1  Mar. 8, 2007

(51) Int. Cl.
*G01V 3/30* (2006.01)
*G01V 3/08* (2006.01)

(52) U.S. Cl. ................................ 324/338; 324/333

(58) Field of Classification Search .............. 340/854.5, 340/853.1–853.5; 324/332–334, 338–340, 324/354–357, 366, 369, 371–372; 175/40, 175/50; 702/6–7, 9–11

See application file for complete search history.

(56) References Cited

U.S. PATENT DOCUMENTS

| | | | |
|---|---|---|---|
| 2,400,170 A | 5/1946 | Silverman | |
| 4,860,581 A | 8/1989 | Zimmerman et al. | |
| 4,876,511 A | 10/1989 | Clark | |
| 4,899,112 A | 2/1990 | Clark et al. | |
| 4,936,139 A | 6/1990 | Zimmerman et al. | |
| 4,949,045 A | 8/1990 | Clark et al. | |
| 4,968,940 A | 11/1990 | Clark et al. | |
| 5,235,285 A | 8/1993 | Clark et al. | |
| 5,339,036 A | 8/1994 | Clark et al. | |
| 5,359,324 A | 10/1994 | Clark et al. | |
| 5,396,232 A | 3/1995 | Mathieu et al. | |
| 5,517,464 A | 5/1996 | Lerner et al. | |
| 5,530,358 A | 6/1996 | Wisler et al. | |
| 5,642,051 A | 6/1997 | Babour et al. | |

(Continued)

FOREIGN PATENT DOCUMENTS

EP  0 903 591  3/1999

(Continued)

OTHER PUBLICATIONS

J.E. Dennis and R.B. and Schnabel, *Numerical Methods for Unconstrained Optimization and Nonlinear Equations*, Chaptor 10 "Nonlinear Least Squares," pp. 218-238, Prentice Hall, NJ (1983).

(Continued)

*Primary Examiner*—Bot LeDynh
(74) *Attorney, Agent, or Firm*—Jonna Flores; Darla Fonseca; Dale Gandier

(57) ABSTRACT

A formation evaluation system for a subterranean formation penetrated by a wellbore. The formation evaluation system is provided with a downhole tool and a sensor. The downhole tool is positionable in the wellbore. The downhole tool has a downhole electromagnetic unit for communication with a surface electromagnetic unit. The sensor determines at least one wellsite parameter from the electromagnetic signal. The downhole tool and the surface electromagnetic unit are adapted to pass electromagnetic signals there between. The electromagnetic signals pass through the subterranean formation whereby the senor determines the at least one wellsite parameter from the electromagnetic signal.

21 Claims, 4 Drawing Sheets

U.S. PATENT DOCUMENTS

| | | |
|---|---|---|
| 5,781,436 A | 7/1998 | Forgang et al. |
| 6,114,972 A | 9/2000 | Smith |
| 6,173,793 B1 | 1/2001 | Thompson et al. |
| 6,188,222 B1 | 2/2001 | Seydoux et al. |
| 6,208,265 B1 | 3/2001 | Smith |
| 6,445,307 B1 | 9/2002 | Rassi et al. |
| 6,509,738 B1 | 1/2003 | Minerbo et al. |
| 6,577,129 B1 | 6/2003 | Thompson et al. |
| 6,577,244 B1 | 6/2003 | Clark et al. |
| 6,657,597 B2 * | 12/2003 | Rodney et al. .............. 343/719 |
| 6,677,756 B2 | 1/2004 | Fanini et al. |
| 6,727,827 B1 | 4/2004 | Edwards et al. |
| 7,126,492 B2 | 10/2006 | MacMillan et al. |
| 2006/0086497 A1 * | 4/2006 | Ohmer et al. .......... 166/250.01 |

FOREIGN PATENT DOCUMENTS

| | | |
|---|---|---|
| EP | 1 035 299 | 9/2000 |
| EP | 0896429 | 8/2005 |
| GB | 2 405 422 | 3/2006 |

OTHER PUBLICATIONS

UK Search Report dated Aug. 13, 2007 Application No. GB0613880.4.

* cited by examiner

FORMATION EVALUATION SYSTEM AND METHOD

BACKGROUND OF THE INVENTION

The present invention relates to the evaluation of a subterranean formation penetrated by a wellbore. More particularly, the present invention relates to techniques for deriving at least one formation parameter from signals generated by a downhole tool positioned in the wellbore.

The exploration of hydrocarbons involves placement of a downhole tool into the wellbore to perform various downhole operations. There are many types of downhole tools used in downhole operations. Typically, a drilling tool is suspended from an oil-rig and advanced into the earth to form the wellbore. The drilling tool may be a measurement-while-drilling (MWD) or a logging-while-drilling (LWD) tool adapted to perform downhole operations, such as taking measurements, during the drilling process. Such measurements are generally taken by instruments mounted within drill collars above the drill bit and may obtain information, such as the position of the drill bit, the nature of the drilling process, oil/gas composition/quality, pressure, temperature and other downhole conditions.

In some instances, it may be desirable to obtain additional data from the wellbore after drilling is complete. In such cases, the downhole drilling tool may be provided with downhole evaluation systems adapted to collect downhole information. Alternatively, the downhole drilling tool may be removed, and a separate downhole evaluation tool, such as a wireline, slickline, drill stem test or coiled tubing tool, may be lowered into the wellbore to perform additional testing, sampling and/or measuring.

Downhole evaluation tools may be provided with communication systems adapted to send signals, such as commands, power and information, between a downhole unit housed in the downhole tool, and a surface unit. Communication systems in drilling tools may include, for example, mud pulse systems that manipulate the flow of drilling mud through a downhole drilling tool to create pressure pulses. One such mud pulse system is disclosed in U.S. Pat. No. 5,517,464 and assigned to the assignee of the present invention. Other communication systems, such as wired drill pipe, electromagnetic, acoustic or other telemetry systems may also be provided. Downhole wireline tools typically communicate through the armored wired cable used as the conveyor for the wireline tool.

In some instances, such as when the communication system is unavailable, inactive or detached, such as during memory mode logging, data is collected and stored in a memory unit within the downhole tool for later retrieval. By way of example, some wireline tools are deployed into the wellbore without the wireline connection between the surface system and the downhole tool. The use of a wireline can be too risky to use, or too costly to justify the expense. The wireline cable may be detached, and the logging tool operated using self-contained power supplies (usually batteries) and data memory units (data memory and circuitry to bus the data from the sensors). Such a tool is placed in operation at the surface, then lowered into the wellbore by a conveyor, or dropped or pumped down the wellbore. The tool may be moved past multiple depth intervals, or it may be left at a single depth in the well. Regardless, the tool will record well data and store the data in memory for collection by the operator at some future time, such as when the tool is returned to the surface. During this type of 'memory mode' logging, the operator typically has no communication with the tool to ensure that the tool is working properly throughout the operation, to turn the tool off and on, to change the type of data collected by the tool, or to change the frequency at which the data is collected. The data collected during memory mode logging is typically retrieved by establishing (or re-establishing) a wired or mud pulse communication link between the downhole tool and the surface, or by retrieving the tool to the surface and downloading the information from the memory unit.

Wireless communication techniques, such as electromagnetic (or emag) telemetry systems, having been employed in downhole drilling tools. Such systems include a downhole electromagnetic communication unit that creates an electromagnetic field capable of sending a signal to a remote surface electromagnetic communication unit. Examples of a downhole electromagnetic communication unit are disclosed in U.S. Pat. No. 5,642,051 and U.S. Pat. No. 5,396,232, both of which are assigned to the assignee of the present invention. Current downhole electromagnetic communication units have been used in conventional MWD type drilling operations.

Advancements, such as the use of repeaters and gaps, have been implemented in existing downhole tools to improve the operability of electromagnetic systems in downhole applications. The gap, or non-conductive insert, is positioned between adjoining sections of drill pipe to magnify the electromagnetic field and provide an improved signal. Examples of a gap used in a downhole electromagnetic communication unit are described in U.S. Pat. No. 5,396,232, assigned to the assignee of the present invention and U.S. Pat. No. 2,400,170 assigned to Silverman.

Communication systems are typically positioned in downhole tools and used to convey information collected by the downhole tool to a surface unit for analysis. Downhole tools are often used to perform formation evaluation to collect information about the subterranean formations. The downhole tools are provided with components capable of measuring formation parameters, such as pressure, temperature, permeability, porosity, density, viscosity, resistivity and more. This collected information is transferred to the surface using the communication systems.

Resistivity of the formation is one such formation parameter collected during downhole formation evaluation. Resistivity is an important parameter to understand and increase reservoir production. This is largely because of the rule that water conducts electricity and hydrocarbons do not. If the formation resistivity and its porosity are known; an estimate can be made of the fluid in the pore spaces. An example of a technique describing a resistivity measurement is provided in U.S. Pat. No. 6,188,222.

Despite the advancement in communication and formation evaluation, there remains a need to provide low cost and efficient alternatives to existing techniques. It is desirable that such techniques eliminate the need for duplicate devices and/or operations to perform telemetry and formation evaluation operations. It is further desirable that such techniques reduce the costs and complexities associated with the existing resistivity measurement and electromagnetic telemetry tools. It is, therefore, desirable to provide techniques that provide the ability to measure at least one parameter of the subterranean formation while passing electromagnetic signals through the formation using the electromagnetic telemetry system.

SUMMARY OF THE INVENTION

In at least one aspect, the present invention relates to a formation evaluation system for a subterranean formation penetrated by a wellbore. The formation evaluation system is provided with a downhole tool and a sensor. The downhole tool is positionable in the wellbore. The downhole tool has a downhole electromagnetic unit for communication with a surface electromagnetic unit. The sensor determines at least one wellsite parameter from the electromagnetic signal. The downhole tool and the surface electromagnetic unit are adapted to pass electromagnetic signals there between. The electromagnetic signals pass through the subterranean formation whereby the senor determines the at least one wellsite parameter from the electromagnetic signal.

In one version, the downhole electromagnetic unit of the formation evaluation system is provided with an antenna, a control circuitry and a processor. The control circuitry is operably connected to the antenna for directing signals to the antenna whereby an electromagnetic field is generated and modulated for communicating the signals to the surface electromagnetic unit. The processor is operatively connected to the control circuitry.

In another version, the senor of the formation evaluation system determines a data signal indicative of the at least one parameter, and wherein the processor causes the data signal to be directed to the control circuitry for communication to the surface electromagnetic unit.

The antenna can be constructed in several different manners typically using a voltage potential to create the electromagnetic signals. For example in one version, the antenna includes at least two conductive members, and an insulative member electrically isolating the two conductive members. The control circuitry is operably connected to at least one of the conductive members for directing signals to the at least one conductive member. In another version, the antenna includes a coil for creating the electromagnetic signals via inductive coupling.

In another version, the signals directed to the antenna by the control circuitry include a carrier having a relatively low frequency being receivable by the surface electromagnetic unit.

In yet another version, the sensor is a downhole sensor, and a measurement signal is superimposed on the carrier signal so that the downhole sensor can detect the measurement signal in the presence of the carrier signal. This can be carried out in various manners. For example, the measurement signal can be at a higher frequency than the carrier signal. In another version, the detection of the measurement signal is made by measuring the difference between two signals; wherein a first signal is the measurement signal superimposed upon the carrier signal; and wherein a said second signal is an approximation of said carrier signal.

In yet another version, the processor periodically directs signals to the control circuitry for communication to the antenna. The sensor collects data to generate the data signal in one period, and communicates the data signal to the processor for communication to the control circuitry in a subsequent period.

The sensor can determine the parameter of the formation in a variety of manners. For example in one version the sensor monitors the properties of the electromagnetic signal to determine at least one parameter of the subterranean formation from the electromagnetic signal. In another version, the senor monitors properties of the control circuitry to determine at least one parameter of the subterranean formation from the electromagnetic signal. The sensor can be either integral to the control logic or separate from the control logic. The sensor can be located down hole, or at the surface. When the sensor is down hole, the sensor can associated with and located adjacent to the downhole electromagnetic unit, or separate from the downhole electromagnetic unit and located remotely from the downhole electromagnetic unit.

In another version, the formation evaluation system is provided with a second downhole tool located remotely from the downhole tool. The sensor can be located on the second downhole tool, located within the subterranean formation, associated with the surface electromagnetic unit, located below the downhole electromagnetic unit, or located within a bottom hole assembly of the drill string and combinations thereof.

The at least one parameter determined by the senors can be a variety of different measurements, such as resistivity, pressure, temperature, permeability, porosity, density, or viscosity.

The present invention also relates to a method of evaluating a subterranean formation penetrated by a wellbore. In the method, a downhole tool is positioned in the wellbore and an electromagnetic signal is passed between a downhole electromagnetic unit of the downhole tool and a surface electromagnetic unit. The electromagnetic signal passes through the subterranean formation. Then, at least one wellsite parameter (e.g., a resistivity measurement) is determined from the electromagnetic signal.

In one version, the electromagnetic signal is encoded with data indicative of the parameter of the subterranean formation.

The at least one parameter can be determined in a variety of different manners. For example, the at least one parameter can be determined by monitoring a control circuit of the downhole electromagnetic unit. In another version, the at least one parameter can be determined by monitoring the physical properties of the electromagnetic signal, such as a current or a voltage of the electromagnetic signal.

In another version, a high frequency signal can be superimposed on top of a low frequency carrier signal to generate the electromagnetic signal.

In yet another version, the present invention relates to a method of evaluating a subterranean formation having a wellbore penetrating the subterranean formation. The method involves deploying a downhole tool into the wellbore, transmitting a first electromagnetic encoded telemetry signal through the subterranean formation between a downhole tool and a surface unit, calculating a wellsite parameter from the first encoded electromagnetic telemetry signal, encoding at least one subsequent electromagnetic telemetry signal with data correlated with the calculated wellsite parameter, transmitting at least one subsequent electromagnetic telemetry signal through the subterranean formation between a downhole tool and a surface unit, receiving the second electromagnetic telemetry signal by a surface electromagnetic unit and determining the wellsite parameter from the at least one subsequent electromagnetic telemetry signal.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
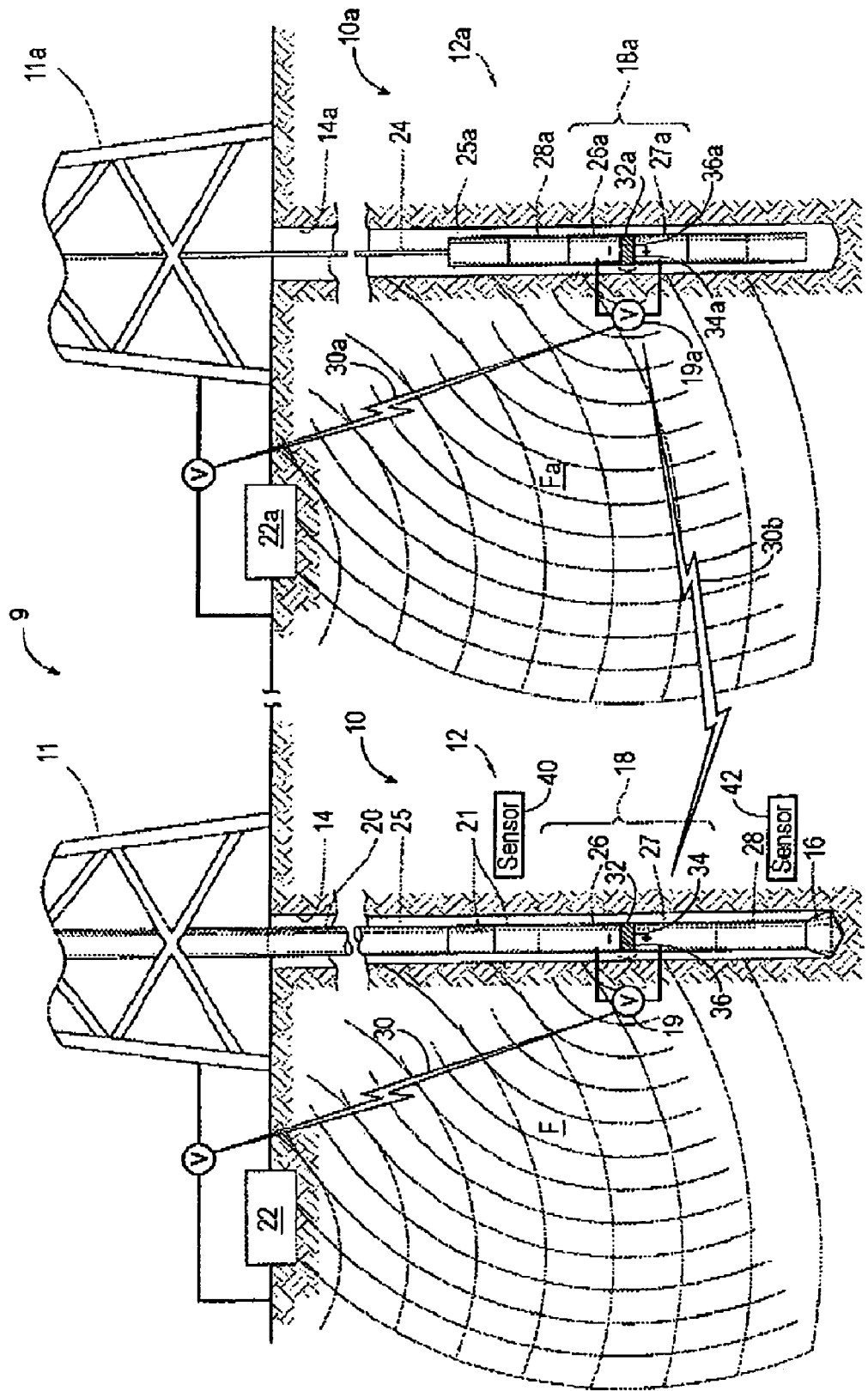
FIG. 1 is a schematic illustration of an electromagnetic system for a downhole drilling tool suspended from a rig and positioned in a wellbore.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

FIG. 1 illustrates a reservoir system 9 for evaluating at least one subterranean formation. FIG. 1 depicts a first electromagnetic system 10 used in cooperation with a downhole drilling tool 12, a second electromagnetic system 10a used in cooperation with a downhole wireline tool 12a. The first electromagnetic system 10 is spaced a distance from the second electromagnetic system 10a. The first and second electromagnetic systems 10 and 10a can function separately or together to derive near-well bore parameters, reservoir parameters or other wellsite parameters. While the reservoir system 9 is depicted as having two different electromagnetic systems 10 and 10a, one or more similar or different electromagnetic systems may be used.

Referring to FIG. 1, the first electromagnetic system 10 is provided with the downhole drilling tool 12 having a downhole electromagnetic unit 18. The downhole drilling tool 12 is suspended from a first rig 11 and into a first wellbore 14.

The downhole drilling tool 12 is adapted to drill the first wellbore 14. The downhole drilling tool 12 is operatively connected to the first rig 11 via drill string 20 and includes a drill bit 16 at a lower end thereof. The drill string 20 includes a plurality of drill collars 21 connected to form the drill string 20. Two such adjacent drill collars 26 and 27 (other drill collars are shown in FIG. 1 as 21) house the downhole electromagnetic unit 18. Various components, such as sensors 19 (i.e. pressure, temperature, current, voltage, and other downhole parameters), power unit 28, a memory unit 25, downhole electromagnetic unit 18 as well as other components, are positioned in one or more drill collars 21 and enable the downhole drilling tool 12 to perform various downhole operations.

The downhole electromagnetic unit 18 is operatively coupled, preferably via a wireless link, to a first surface electromagnetic unit 22 for passing signals there between via a link 30. The first surface electromagnetic unit 22 may include one or more surface receivers (not shown) to minimize effects from surface electrical noise.

The downhole drilling tool 12 may optionally be provided with mud pulse, wired drill pipe or other telemetry systems for transmission between the surface and the downhole drilling tool 12. The downhole drilling tool 12 may also be provided with a memory module 25 in the downhole drilling tool 12 for storing data. This data may be selectively accessed and transmitted to the surface, and/or retrieved from the memory module 25 by retrieving the downhole drilling tool 12 to the surface.

The downhole electromagnetic unit 18 may be used to generate an electromagnetic field F receivable by the first surface electromagnetic unit 22. The electromagnetic field is capable of wirelessly transmitting data collected by the downhole electromagnetic unit 18 to the first surface electromagnetic unit 22. By way of example, the downhole electromagnetic unit 18 may be used to transfer data to the surface when the downhole drilling tool 12 is performing memory mode logging. The first surface electromagnetic unit 22 is also adapted to generate an electromagnetic field receivable by the downhole electromagnetic communication unit 18. The first surface electromagnetic unit 22 may also be adapted to send signals receivable by the downhole electromagnetic unit 18.

FIG. 1 depicts the second electromagnetic system 10a. The second electromagnetic system 10a is provided with a downhole wireline tool 12a disposed in a second wellbore 14a for performing various formation evaluation operations, such as testing and sampling. The second wellbore 14a is provided remotely from the first wellbore 14 such that the wellbore 14 and 14a are separate and spaced a distance apart.

The downhole wireline tool 12a may include various components, such as power, sample chambers, hydraulic units, probes, packers, anchors or other devices, such as those described in U.S. Pat. No. 4,936,139 and U.S. Pat. No. 4,860,581, assigned to the assignee of the present invention. Such components may include sensors 19a adapted to take various measurements (i.e. pressure, temperature, current, voltage, and other downhole parameters), a power module 28a, a memory module 25a and telemetry modules 26a and 27a.

The downhole wireline tool 12a is suspended in the second wellbore 14a via a wireline cable 24 from a second rig 11a. The downhole wireline tool 12a may optionally be lowered to selected depths in the second wellbore 14a via various conveyors, such as a slickline, drill pipe, coiled tubing or other known techniques. Such a connector may be wired such that signals may pass between the surface and the downhole wireline tool 12a to perform various operations and transmit data. The connector may be selectively deactivated, released, or reconnected as will be understood by those of skill in the art.

Data collected by the downhole wireline tool 12a may be retrieved from the memory module 25a upon retrieval of the downhole wireline tool 12a to the surface, or by transmission via the wireline cable 24 for later use. In cases where the connector is detached, deactivated or incapable of transmitting data to the surface, the downhole wireline tool 12a stores such data in the memory module 25a in the downhole wireline tool 12a.

The data may be transmitted to the surface via a downhole electromagnetic unit 18a positioned in telemetry modules 26a and 27a. The downhole electromagnetic unit 18a may be used to generate an electromagnetic field Fa receivable by a second surface electromagnetic unit 22a via a link 30a.

An additional link 30b may be provided to operatively connect the first and second electromagnetic systems 10 and 10a. The electromagnetic field Fa is capable of wirelessly transmitting data collected in the memory module 25a to the second surface electromagnetic unit 22a. The downhole electromagnetic units 18 and 18a, as well as the surface electromagnetic units 22 and 22a can each communicate bi-directionally with each other. Thus, for example, the downhole electromagnetic communication unit 18 can communicate bi-directionally with the downhole electromagnetic communication unit 18a, and the surface electromagnetic communication units 22 and 22a. Any number of links, telemetry units, surface units and tools may be used.

The downhole electromagnetic communication units 18 and 18a are provided with respective antennas 32 and 32a by which the electromagnetic waves are passed, i.e., sent out or received. In one preferred embodiment depicted in FIG. 1, the antennas include at least two conductive members, such as the drill collars 26 and 27 and the telemetry modules 26a and 27a.

Insulative members 34 and 34a electrically isolate the drill collars 26 and 27, and the telemetry modules 26a and 27a.

In use, the drill collars 26 and 27 are typically of opposite polarity with the insulative member 34 or 34a forming gaps 36 or 36a there between. The gap 36 is typically embedded within the mandrel between the upper and lower drill collars. Similarly, the telemetry modules 26a and 27a are typically of opposite polarity with the insulative members 34a forming the gap 36a there between. The gap collar is used to extend the resistance generated by the electromagnetic systems 10 and 10a over a greater distance, and/or to enhance the electrical connection between the drill collars. Examples of techniques for constructing the drill collars 26 and 27, as well as the telemetry modules 26a and 27a, are described in detail in a co-pending U.S. patent application Ser. No. 10/707,970, the entire contents of which is hereby incorporated herein by reference.

Referring back to FIG. 1, the reservoir system 9 is also provided with one or more sensors 40 and 42 positioned at various locations about the wellsite. The sensors 40 and 42 can be electromagnetic signal transceivers for passing electromagnetic signals with the downhole electromagnetic unit 18, and the first surface electromagnetic unit 22. Similar sensors may be provided in the second electromagnetic system 10a for use with downhole electromagnetic unit 18a and second surface electromagnetic unit 22a. Various sensors may be positioned about the reservoir system. Additional sensors may be used to measure a variety of wellsite or reservoir parameters (surface or downhole), such as wellbore pressure, formation pressure, temperature, resistivity etc.

Figure 2:
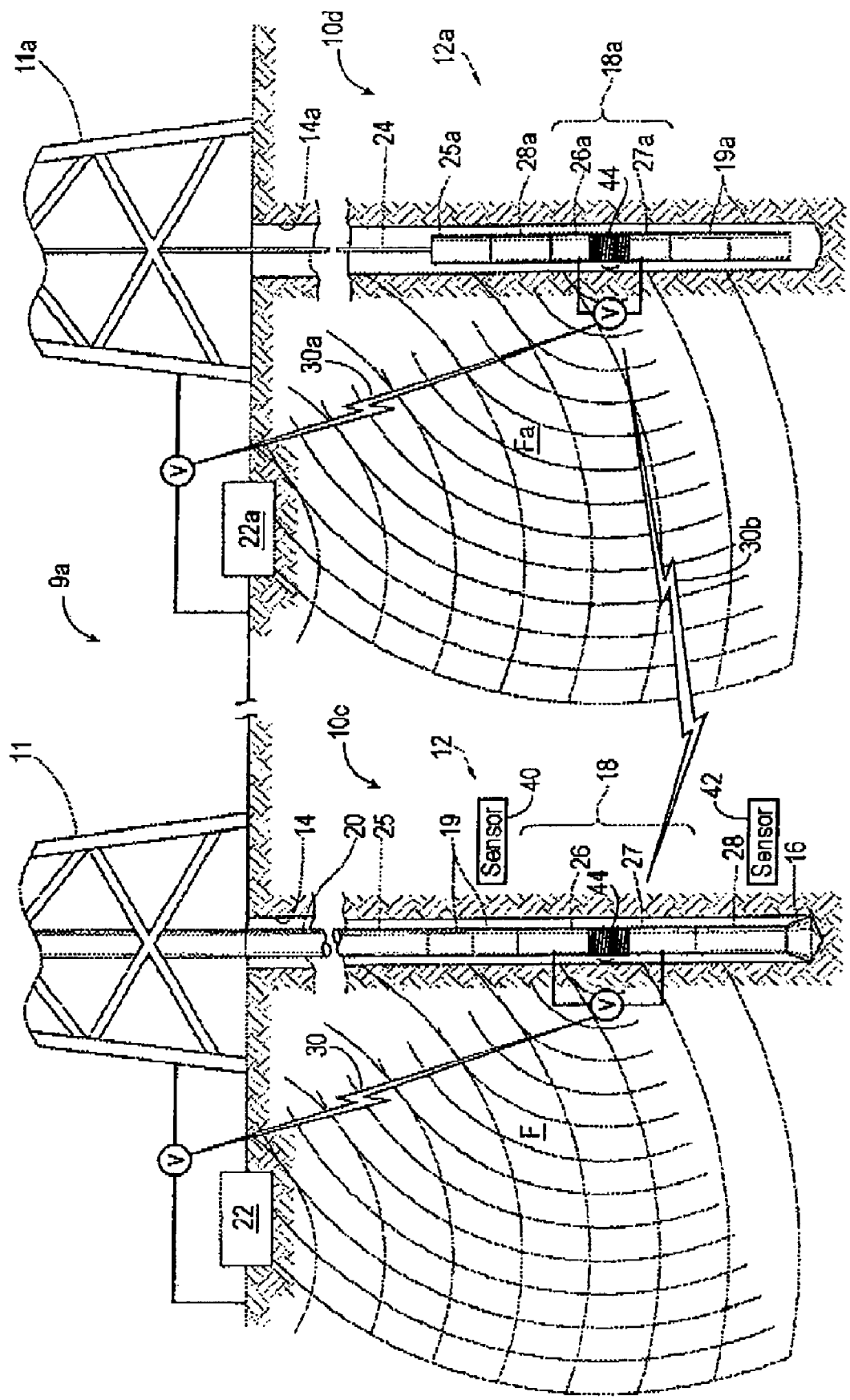
FIG. 2 is a schematic illustration of the electromagnetic system of FIG. 1 provided with inductive coupling.

FIG. 2 illustrates another configuration of a reservoir system 9a for evaluating at least one subterranean formations. The reservoir system 9a is constructed and operated in a similar manner as the reservoir system 9, with the exception that the reservoir system 9a has first and second electromagnetic systems 10c and 10d, respectively. First electromagnetic system 10c has an electromagnetic unit 18 that utilizes antennas having coils 44 for creating the electromagnetic signals via inductive coupling in place of the antenna 32, insulative member 34 and gap 36 of FIG. 1. Second electromagnetic system 10d has an electromagnetic unit 18a that utilizes antennas having coils 44 for creating the electromagnetic signals via inductive coupling in place of the antenna 32a, insulative member 34a and gap 36a of FIG. 1.

Figure 3:
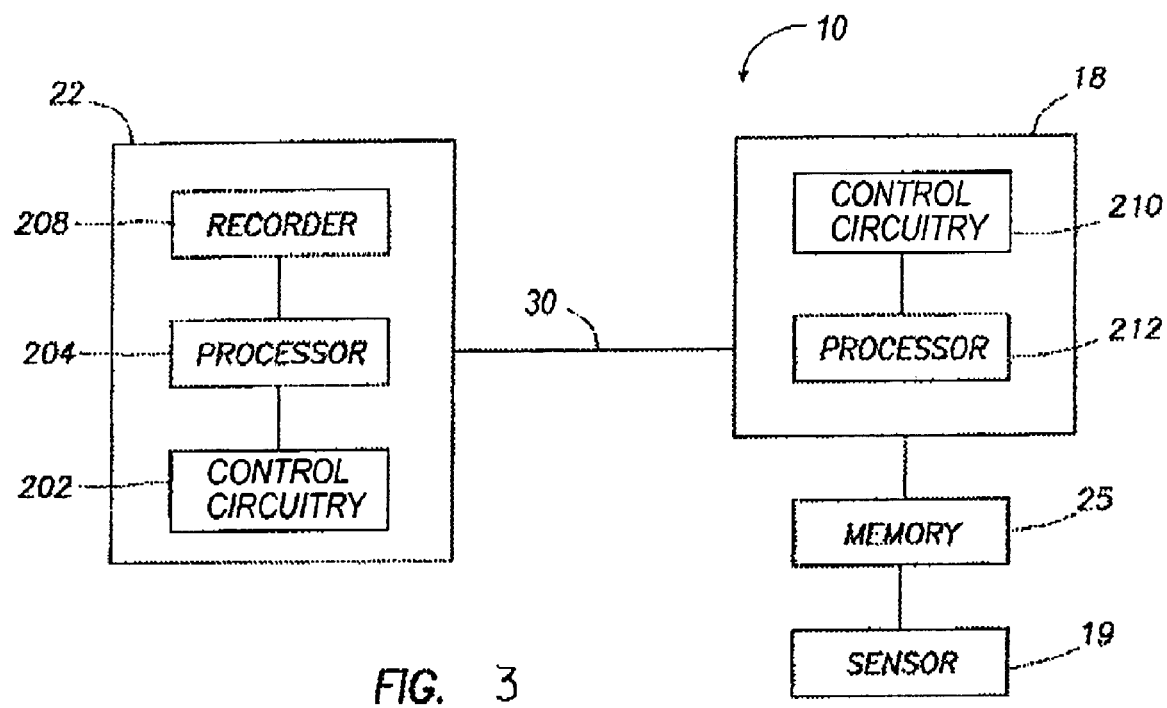
FIG. 3 is a block diagram of the electronics for the electromagnetic system of FIGS. 1 and 2.

FIG. 3 is a schematic electrical diagram depicting the communication between the surface and downhole electromagnetic units 22 and 18 of FIG. 1. The surface and downhole electromagnetic communication units 22a and 18a are constructed in a similar manner and will not be described herein separately for purposes of brevity.

A communication link 30 is established between the surface electromagnetic communication unit 22 and the downhole electromagnetic communication unit 18. As shown in FIG. 1, this link is a wireless link passing through the earth. Data collected via one or more sensors 19 is stored in memory 25. The sensors 19 and/or memory 25 may be separate from, or integral with, the downhole electromagnetic communication unit 18. The data is processed via processor 212 and transmitted to the surface via control circuitry 210, which preferably includes a transceiver. The control circuitry 210 is also adapted to receive signals from and transmit signals to the surface electromagnetic communication unit 22.

The surface electromagnetic communication unit 22 includes control circuitry 202, a processor 204 and a recorder 208. The control circuitry 202 receives signals from and transmits signals to the downhole electromagnetic communication unit 18. The downhole data is received by the control circuitry 202 and sent to the programmable processor 204 for processing. The data is then recorded in the recorder 208 upon acceptance. A synchronized clock may optionally be coupled to the surface and/or downhole electromagnetic communication units 22 and 18 for synchronization of the electromagnetic system 10.

The communication link 30 is preferably created by the electromagnetic field F generated by the surface electromagnetic communication unit 22 and/or the downhole electromagnetic communication unit 18. The Field F is preferably used as a wireless coupling for the passage of signals between the surface and downhole electromagnetic units 22 and 18.

Figure 4:
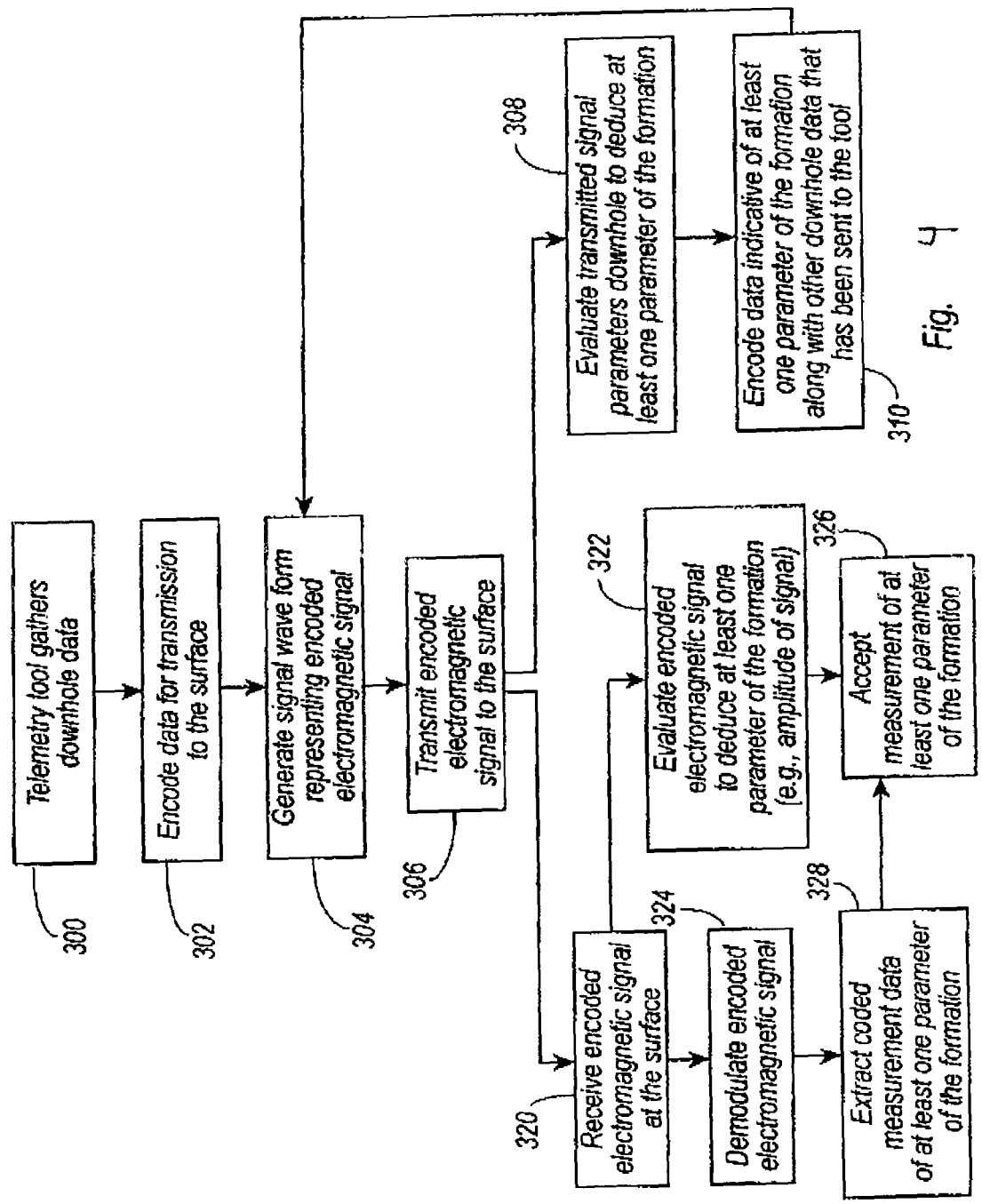
FIG. 4 is a logic flow diagram illustrating examplary operations of the electromagnetic system of FIGS. 1 and 2.

Referring to FIG. 4, shown therein is a logic flow diagram summarizing the operations of the electromagnetic systems 10 and/or 10a. The flow diagram describes operations where a measurement parameter is determined as a signal is passed from downhole electromagnetic units 18 and/or 18a to a surface unit 22 and/or 22a. It will be appreciated that the same technique may be used to determine a measurement parameter as a signal is passed from a surface unit 22 and/or 22a to downhole electromagnetic units 18 and/or 18a. At least one electromagnetic signal may be passed between the downhole electromagnetic unit(s) and the surface unit(s). The same signal(s) may be used as a measurement for obtaining a downhole parameter and as a transmission signal for transmitting data. Alteratively, one or more independent signals may be used for measurement and/or transmission. Similar techniques may be used for the electromagnetic systems 10c and 10d of FIG. 2.

In one example, in a first step 300, the processor 212 of the downhole electromagnetic communication units 18 or 18a gathers downhole data to be transmitted to the surface electromagnetic communication units 22 or 22a. The processor 212 causes the downhole data to be encoded 302 for transmission to the surface electromagnetic communication units 22 or 22a. Once the downhole data is encoded, the processor 212 causes the control circuitry 210 to generate 304 an encoded electromagnetic signals and transmit 306 the encoded electromagnetic signals to the surface electromagnetic communication units 22 or 22a.

Then, the processor 212 obtains data from the sensors 19 or 19a to determine the information indicative of the formation resistivity at a step 308. The processor 212 can then calculate the formation resistivity from the data. The calculated formation resistivity along with other downhole data that has been sent to the downhole electromagnetic communication units 18 or 18a may be encoded in a step 310. Alternatively, the processor 212 can encode the raw data indicative of the formation resistivity along with the other downhole data that has been sent to the downhole electromagnetic communication units 18 or 18a in the step 310. The processor 212 then branches to step 304 where the electromagnetic signal is generated with the encoded data to be transmitted to the surface electromagnetic communication units 22 or 22a.

Also shown in FIG. 4 are two separate processes of obtaining at least one parameter, e.g., resistivity, of the formation in accordance with the present invention. Although the following processes will be described utilizing the example of determining the resistivity of the formation, such processes are equally applicable to determining other parameters of the formation. In a step 320, the control circuitry 202 of the surface electromagnetic communication unit 22 or 22a receives the encoded electromagnetic signal at the surface. The processor 204 can then either branch to a step 322, or a step 324. In the step 322, the processor 204 evaluates the encoded electromagnetic signal parameters to be deduced or calculates the formation resistivity using equation 1.1 discussed above, for example. Once the formation resistivity is calculated, the processor 204 branches to a step 326 where the mean formation resistivity is accepted and recorded. Alternatively, the processor 204 can branch to the step 324 where the encoded electromagnetic signal is demodulated (or decoded). Then, the processor 204 branches to a step 328 where the resistivity measurement data is extracted. Once the resistivity measurement data is extracted, the processor 204 branches to the step 326 where the resistivity measurement data is accepted and recorded.

Various steps as depicted in FIG. 4 may be performed at various times. For example, the step 306 of transmitting the signal may be performed simultaneously with other steps, such as step 308 involving deducing at least one parameter of the formation.

At least one parameter of the subterranean formation is determined from the electromagnetic signal(s) passed between the surface electromagnetic units 22 and 22a, the downhole electromagnetic units 18 and 18a and combinations thereof. The parameter can be any type of parameter capable of being determined from the electromagnetic signal (s). For example, the parameter can be a pressure, temperature, permeability, porosity, density, viscosity, resistivity or other measurement.

The at least one parameter can be characterized as a "near-well bore parameter", or a "reservoir parameter" for subterranean formations. The near-well bore parameter refers to measurements derived from (1) electromagnetic signals passed between one of the downhole electromagnetic units 18 or 18a and one of the surface electromagnetic units 22 or 22a positioned adjacent the wellbore 14 or 14a in which the downhole electromagnetic units 18 or 18a is disposed, or (2) monitoring the properties of the generated electromagnetic signals. Examples of near-well bore parameters are the mean formation resistivity referred to below, or deep well resistivity measurements derived from monitoring the properties of the generated electromagnetic signals.

The reservoir parameter refers to measurements derived from passing electromagnetic signals between (1) the downhole electromagnetic communication units 18 and 18a, and (2) either of the downhole electromagnetic communication units 18 or 18a and the sensors 40 or 42 located within the subterranean formation. There are two distinct ways of obtaining a parameter measurement, such as a resistivity measurement, from the electromagnetic signals passed between the surface electromagnetic units 22 and 22a, the downhole electromagnetic units 18 and 18a and combinations thereof. That is, a voltage difference across the GAP induces current to flow into the formation. Varying the frequency of the applied voltage allows measured data downhole to be transmitted to the surface.

Under certain simplifying assumptions, such as having a homogeneous formation and a low (but not-zero) frequency of transmission, then Maxwell's equation of electromagnetic wave propagation can be reduced to a simple equation depicting the signal strength at the surface. In a homogeneous reservoir, the current wave "propagates" along the drill string and the signal received at the receiver antenna is proportional to:

$$i = Ie^{-[k*d*\sqrt{f/R}]} \quad (1.1)$$

where:
i=Current returning to the GAP at "d" (Depth or distance above the GAP)
I=Current injected into formation
f=Signal frequency
d=Depth or distance above the GAP
R=Mean formation resistivity
k=Constant of proportionality From Equation (1.1) above, one can see that if the distribution of current on the drillpipe is known, or equivalently, the distribution of voltage along the earth's surface, then one can compute R—the mean formation resistivity. E.g., if the two current measurements at distances d1 and d2, and corresponding measurements of current i1 and i2 are known, then taking the ratio from Equation (1.1) one could obtain:

$$\log(i1/i2)=k(d2-d1)* \operatorname{sqrt}(f/R) \quad (1.2).$$

A similar formula can be derived using voltage measurements at the surface obtained by the surface electromagnetic unit 22 or 22a. In this case the decay is logarithmic with distance from the wellbores 14 or 14a, so a minimum of two measurements at two different distances from the wellbore would be needed.

A second metod of obtaining a near-well bore resistivity measurement is to use one of the sensors 19 to measure the current injected across the gap 36 or 36a and the voltage induced across the gap 36 or 36a. The ratio of the voltage by the current is the impedance of the gap 36 or 36a and will be the sum of the effective resistances affecting the current as it crosses the gap 36 or 36a, namely surface effects on the collar, resistance of the borehole mud, and the resistance of the formation. The effective resistance of the formation will be proportional to the resistivity of the formation.

The effects due to contact impedance and mud resistivity can be removed by making multiple measurements of voltage several distances awry from the gap 36 or 36a. The sensor 19 for measuring the voltage can be either integral to the control circuitry 210 or a secondary sensor (electrode) located away from the control circuitry 210, such as within the downhole electromagnetic communication unit 18 or 18a. The signal strength is typically a function of how much current is pumped into the formation. As the formation resistivity (resistance) changes, so does the current/signal. This change can be detected in the control circuitry 210 and/or with an electrode located somewhere else in the downhole electromagnetic communication unit 18 or 18a.

The processor 212 may cause the control circuitry 210 to transmit a first electromagnetic encoded signal into the subterranean formation for the purpose of communicating downhole drilling information to the surface electromagnetic communication unit 22. The sensors 19 read information from the transmission of the first electromagnetic encoded signal and the processor 212 calculates a parameter of the subterranean formation from the transmission of the first encoded electromagnetic signal. Then, the processor 212 causes the control circuitry of the downhole electromagnetic communication unit 18 to transmit subsequent second electromagnetic signals into the subterranean formation.

The subsequent second electromagnetic signals are encoded with data correlated with the data signal indicative of the parameter of the subterranean formation. The second electromagnetic signal is received by the surface electromagnetic communication unit 22, which decodes the second electromagnetic signal to determine the parameter of the subterranean formation from the second electromagnetic signal.

The electromagnetic signals are desirably created with a relatively low carrier frequency so that the electromagnetic signal can be received by the surface electromagnetic units 22 or 22a. Increasing the frequency can reduce the effects due to contact impedance. Thus, a measurement signal having a higher frequency (e.g., having a frequency at least 2-3 times greater than the carrier frequency) may be interposed on the carrier frequency. As will be discussed in more detail below, this superimposed component (measurement signal) of the transmitted electromagnetic signal may be structured to make a better parameter, e.g., resistivity, measurement than the carrier frequency alone.

The measurement signal can be transmitted at a frequency higher than the dominant carrier signal. However, because of the changing data stream in the carrier, there will be high frequency components within the carrier signal, and those high frequency components could obscure the measurement signal. The control circuitry 210 creating the carrier signal could also have nonlinearities which would create noise in higher frequency bands. Standard signal processing techniques are known to remove noise from the measurement signal. The processor 212 or the sensor 19 can be programmed or otherwise adapted to measure the difference between two signals; wherein the first signal is the combination of a measured signal plus the carrier signal; and the second signal is a synthetic approximation of the carrier signal. These two signals can be compared or subtracted by an analog circuit before digitization to effectively increase the number of significant digits available to store the measured signal, after which standard signal processing techniques can be used to extract the measurement from said signal.

In addition, increasing the length of the gap 36 or 36a can reduce the effects due to the mud. In a homogeneous formation, the estimated value will match that of the formation, but as the gap 36 or 36a crosses a bed boundary, artifacts will appear on the estimate. The simpleast technique for determining the estimated value is iterated forward modeling as described below.

The current in the vicinity of the gap 36 or 36a can be accurately estimated by solving Maxwell's equations for a domain including the gap 36 or 36a, the borehole and the formation near the gap 36 or 36a. At low frequencies, the field will decay exponentially away from the gap 36 or 36a, so the domain can be truncated to a relatively small domain, such as a dozen feet or so, around the gap 36 or 36a. If the processor 212 knows the formation resistivity (or resistivities if inhomogeneous) and mud resistivity then a synthetic value of the impedance will be generated by solving Maxwell's equations in that domain. By changing the formation resistivity a different synthetic value will be obtained.

The processor 212 runs a program to find the formation resistivities minimizing the difference between the impedance derived by the sensor(s) 19, 19a, 40 or 42 and the synthetic impedance. The Levenberg-Marquadt non-linear optimization may be used. The Levenberg-Marquadt algorithm is described in many textbooks, for example, in Chapter 10 of *Numerical Methods for Unconstrained Optimization and Nonlinear Equations*, by J. E. Dennis and R. B. Schnabel, Prentice Hall Series in Computational Mathematics, 1983. This invention is not, of course, limited to just using a Levenberg-Marquadt inversion, many other techniques of non-linear inversion are well-known in the art.

A similar technique of iterated forward modeling can be applied to the deep measurement of resistivity. For inhomogeneous reservoirs, the simple expression of Equation (1.1) must be replaced by the result of a forward model of Maxwell's equation. By inputting reservoir properties, a synthetic value of surface signal strength can be obtained. A non-linear optimization code can find the reservoir properties minimizing the difference in actual signal strength from the synthetic signal strength. A multiplicity of resistivity values throughout the formation are not typically obtained from a single measurement at the surface by the surface electromagnetic communication units 22 or 22a. To achieve this, multiple measurements are preferably used with the gap 36 or 36a placed at different depths in the wellbore 14 or 14a. During conventional measurement while drilling operations, the downhole electromagnetic unit 18 is typically continuously transmitting as it is advanced into the ground to the bottom of the well.

A multiplicity of surface receivers also help in processing the necessary signals and/or obtaining the desired measurement(s). The surface electromagnetic units 22 and 22a preferably use a multiplicity of surface receivers to minimize effects from surface electrical noise.

For the deep resistivity application, some simplifications in the forward modeling may be appropriate. For example, in a vertical well it may be a reasonable assumption that the reservoir around the wellbore 14 or 14a is layered with the layers perpendicular to the wellbore 14 or 14a but with minimal variation within each layer. In such circumstances, Maxwell's equation may be used to reduce to a scalar partial differential equation in one variable (e.g. one can solve for the azimuthal component of the magnetic field). This equation tends to be very well posed (the technical expression is that the equation is elliptic). Moreover, there are solution techniques taking advantage of the multiplicity of layers. In effect, one can solve Maxwell's equation in each layer and then mathematically "glue" the solutions together to get a solution for the whole domain. The non-linear inversion for the resistivity calculation, can then also take advantage of the multi-layer solution technique and the result is a stable matrix inversion.

It may be desirable to concentrate the frequency response to a narrow band that doesn't fluctuate with the telemetry. Typically, this type of measurement is preferable for near wellbore measurements. In standard MWD telemetry, a coding technique is used, so that each sequence of binary data 0001110001100000, etc, corresponds to a somewhat different frequency spectrum. Sophisticated signal processing can be used to extract the original binary data out of that frequency spectrum. Such methods may be more robust than using one frequency for all of the transmission (in effect this is the difference between FM and AM transmission of radio waves). However, while this coding makes the telemetry more robust, it may introduce a complexity in the derivation of resistivity.

Preferably, the amount of current at a particular band is provided to the processor 212 computing the resistivity. The processor 212 matches the voltage from the particular band with the amount of current injected into the formation. The processor 212 can determine the theoretical amount of current transmitted, and the processor 212 can determine the binary data it is transmitting. The processor 212 can then compute the amount of current in each frequency band for the transmission, and use that value to match against the actual amount of voltage being transmitted.

Electromagnetic telemetry apparatuses, such as the downhole electromagnetic units 18 and 18a, typically require a large amount of current, which may cause a nonlinear behavior with current amplitude. Consequently, the actual amount of current transmitted in a particular band might be significantly different from the calculated amount. This may introduce an error in the estimate of formation resistivity. One way to avoid this error is to transmit a small measurement signal at a completely different frequency and superimpose this transmission on top of the telemetry data. The measurement of voltage can be made at the superimposed frequency and the unwanted coding effects disappear. In cases where the telemetry data is at a lower frequency, it may be preferably to use a different or higher frequency (e.g., twice or three times). This component of the signal is unlikely to be detected at the surface, because as equation 1.1. shows, the higher the frequency the worse the signal strength at the surface.

Depending on the situation, the frequency used for telemetry applications may vary. In shallow measurements, there is sufficient band width to maintain signal strength and determine a measurement. However, in deep measurements or situations where high frequency rates are used, it may be necessary to use sophisticated signal processing, such as superimposed signal frequencies, to generate the desired measurements. For example, signal processing can be used to convert the changing frequency content into binary data. The surface electromagnetic communication units 22 and 22a can then use that binary data to deconvolute the coding out of the surface measurement and leave a surface signal corresponding to a known source.

In some cases, it may be necessary or desirable to reduce noise. One way to improve the voltage measurement is to take the binary data and within the downhole electromagnetic communication units 18 and 18a compute a low-amplitude copy of the transmitted signal. This low-amplitude signal can be run along separate lines within the circuit board and be used to "float" the measured signal. This low-amplitude signal could also be used of analogue detection or to drive the deconvolution of the downhole coding.

The two different resistivities (shallow and deep) derived from the above techniques can then be compared to make inferences about the formation resistivity. The difference can be attributed either to borehole effects or to possible invasion of the borehole fluid into the rock.

Depending on how the formation resistivity measurement is used, it may be desirable to have this measurement at different depths of investigation radially from the borehole. The depth of the formation resistivity measurement and resolution is typically dependent on the distance between the insulating GAP and the deduction of the relative voltage potential and some other point. The length of the MWD telemetry tool is generally sufficient for most measurements. However, if a deeper measurement is desired, a second voltage potential detection sub, such as the sesnor 42, can be located further up in the BHA, allowing an integral measurement to be tailored to the specific formation properties of interest.

The term sensor, as used herein, means any device determining at least one parameter of the subterranean formation from the electromagnetic signal. More particularly, the sensor is any device either (1) monitoring the properties of the electromagnetic signal to derive data indicative of the parameter, or (2) demodulating the electromagnetic signal to drive the data indicative of the parameter. Examples of "sensors" discussed herein are (1) the surface electromagnetic communication units 22 and 22a which decode the electromagnetic signal to derive the data indicative of the parameter, (2) the sensors 19, 19a, 40 and 42 which monitor the properties of the electromagnetic signals, (3) the downhole electromagnetic communication units 18 and 18a monitoring the properties of each other's electromagnetic signals, and (4) a sensor, other than the sensor 19, 19a, 18 and 18a located at some other location on the drill string or in he formation.

It will be understood from the foregoing description that various modifications and changes may be made in the preferred and alterative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method of evaluating a subterranean formation having a wellbore penetrating the subterranean formation, comprising the steps of:
    deploying a downhole tool into the wellbore;
    transmitting a first electromagnetic encoded telemetry signal through the subterranean formation between a downhole tool and a surface unit;
    calculating a wellsite parameter from the first encoded electromagnetic telemetry signal;
    encoding at least one subsequent electromagnetic telemetry signal with data correlated with the calculated wellsite parameter;
    transmitting at least one subsequent electromagnetic telemetry signal through the subterranean formation between a downhole tool and a surface unit;
    receiving the second electromagnetic telemetry signal by a surface electromagnetic unit; and
    determining the wellsite parameter from the at least one subsequent electromagnetic telemetry signal.

2. A formation evaluation system for a subterranean formation penetrated by a wellbore, comprising:
    a downhole tool positionable in the wellbore, the downhole tool having a downhole electromagnetic unit adapted to communicate with a surface electromagnetic unit via a electromagnetic signal; and
    wherein the electromagnetic signal passes through the subterranean formation between the downhole electromagnetic unit and the surface electromagnetic unit such that a wellsite parameter is determined as a function of one of 1) voltage and 2) current employed to generate the electromagnetic signal as attenuated by passing through the subterranean formation.

3. The formation evaluation system of claim 2, wherein the downhole electromagnetic unit comprises:
    a first antenna;
        a first control circuitry operably connected to the first antenna that controls the first antenna such that an electromagnetic field is generated and modulated for communicating the electromagnetic signals to the surface electromagnetic communication unit; and
        a first processor operatively connected to the first control circuitry.

4. The formation evaluation system of claim 2, wherein the surface electromagnetic unit comprises:
    a second antenna;
        a second control circuitry operably connected to the second antenna that controls the first antenna such that the electromagnetic signals are received from the downhole electromagnetic communication unit; and
        a second processor operatively connected to the second control circuitry; the second processor adapted to determine the wellsite parameter as a function of one of 1) voltage and 2) current.

5. The formation evaluation system of claim 3, wherein the first antenna includes a coil for generating the electromagnetic signals via inductive coupling.

6. The formation evaluation system of claim 3, wherein the second antenna employs a voltage potential to generate the electromagnetic signals.

7. The formation evaluation system of claim 3, wherein the electromagnetic signal include a carrier frequency receivable by the surface electromagnetic unit.

8. The formation evaluation system of claim 2, wherein at least one of the electromagnetic signals comprises a measurement signal and a carrier signal, the measurement signal being superimposed on the carrier signal and wherein the measurement signal is distinguishable from the carrier signal.

9. The formation evaluation system of claim 8, wherein the measurement signal is at a higher frequency than the carrier signal.

10. The formation evaluation system of claim 8, wherein the detection of the measurement signal is performed by measuring the difference between two signals; wherein said first signal comprises the measurement signal superimposed upon the carrier signal; and wherein the said second signal comprises an approximation of said carrier signal.

11. The formation evaluation system of claim 2, the electromagnetic signal further comprising at least two separate signals, the first comprising a measurement signal and the second comprising a carrier signal.

12. The formation evaluation system of claim 2, wherein the at least one wellsite parameter includes a resistivity measurement.

13. A method of evaluating a subterranean formation penetrated by a wellbore, comprising:
positioning a downhole tool in the wellbore;
transmitting an electromagnetic signal between a downhole electromagnetic unit of the downhole tool and a surface electromagnetic unit, wherein the electromagnetic signal transmits one of data and a command and passes through the subterranean formation; and
determining a wellsite parameter from the electromagnetic signal as a function of one of 1) voltage and 2) current relating to the electromagnetic signal as attenuated by passing through the subterranean formation.

14. The method of claim 13, further comprising the step of encoding the electromagnetic signal with data indicative of the wellsite parameter; wherein the determining is based on the data indicative of the wellsite parameter.

15. The method of claim 13, wherein the at least one wellsite parameter includes a resistivity measurement.

16. The method of claim 13, wherein the determining at least one wellsite parameter further comprises to determine the wellsite parameter from the electromagnetic signal.

17. The method of claim 16, wherein the wellsite parameter determined from the electromagnetic signal is determinable as a function of an induced current.

18. The method of claim 17, wherein the wellsite parameter determined from the electromagnetic signal is determinable as a function of the induced current according to formula:

$$i = Ie^{-\left[k*d*\sqrt{\frac{f}{R}}\right]}$$

where:
I=Current returning to a gap in the downhole tool at "d" a depth or distance above the gap; I=Current injected into formation; f=Signal frequency; R=Mean formation resistivity; and k=Constant of proportionality.

19. The method of claim 16, wherein the wellsite parameter determined from the electromagnetic signal is determinable as a function of a voltage potential induced across a gap of the downhole tool.

20. The method of claim 13, wherein the determining and the transmitting are performed concurrently.

21. The method of claim 13, further comprising superimposing a high frequency measurement signal on top of a low frequency carrier signal to generate the at least one electromagnetic signal.

* * * * *